US012679915B2

(12) United States Patent
Abele et al.

(10) Patent No.: US 12,679,915 B2
(45) Date of Patent: Jul. 14, 2026

(54) LATEX FOR BONDING FIBER STRUCTURES

(71) Applicant: Synthomer Deutschland GmbH, Marl (DE)

(72) Inventors: Alexandra Abele, Marl (DE); Sören Butz, Marl (DE); Martin Driever, Marl (DE); Michael Karnop, Marl (DE)

(73) Assignee: Synthomer Deutschland GmbH, Marl (DE)

( * ) Notice: Subject to any disclaimer, the term of this patent is extended or adjusted under 35 U.S.C. 154(b) by 770 days.

(21) Appl. No.: 17/635,045

(22) PCT Filed: Aug. 10, 2020

(86) PCT No.: PCT/EP2020/072341
§ 371 (c)(1),
(2) Date: Feb. 14, 2022

(87) PCT Pub. No.: WO2021/028369
PCT Pub. Date: Feb. 18, 2021

(65) Prior Publication Data
US 2022/0282016 A1 Sep. 8, 2022

(30) Foreign Application Priority Data
Aug. 15, 2019 (GB) ..................................... 1911659

(51) Int. Cl.
*C08F 236/10* (2006.01)
*C08J 5/24* (2006.01)
*D06M 15/693* (2006.01)

(52) U.S. Cl.
CPC ............. *C08F 236/10* (2013.01); *C08J 5/244* (2021.05); *D06M 15/693* (2013.01); *C08F 2800/20* (2013.01); *C08J 2347/00* (2013.01)

(58) Field of Classification Search
None
See application file for complete search history.

(56) References Cited

U.S. PATENT DOCUMENTS

| | | |
|---|---|---|
| 3,563,946 A | 2/1971 | Miller et al. |
| 3,575,913 A | 4/1971 | Meier |
| 3,900,679 A | 8/1975 | Marzocchi |
| 4,472,086 A | 9/1984 | Leach |
| 4,478,974 A | 10/1984 | Lee et al. |
| 4,504,539 A | 3/1985 | Petracek et al. |
| 4,576,858 A | 3/1986 | Fourezon |
| 4,751,111 A | 6/1988 | Lee et al. |
| 4,968,740 A | 11/1990 | Makati et al. |
| 5,017,426 A | 5/1991 | Greiser et al. |
| 6,313,253 B1 | 11/2001 | Baumann et al. |
| 6,693,146 B2 | 2/2004 | Mueller et al. |
| 8,334,350 B2 | 12/2012 | Jahns et al. |
| 9,574,291 B2 | 2/2017 | Gamert et al. |
| 2010/0056717 A1* | 3/2010 | Suddaby .................. C08J 5/045 528/271 |
| 2011/0214796 A1 | 9/2011 | Avramidis et al. |
| 2012/0009379 A1 | 1/2012 | Müller et al. |
| 2013/0295360 A1* | 11/2013 | Nagy ...................... B28B 23/02 442/72 |

FOREIGN PATENT DOCUMENTS

| | | |
|---|---|---|
| CN | 109293814 A | 2/2019 |
| DE | 1905256 A1 | 9/1969 |
| DE | 3347280 A1 | 7/1985 |
| EP | 0160609 A1 | 11/1985 |
| EP | 0176847 A2 | 4/1986 |
| EP | 0281643 A1 | 9/1988 |
| EP | 0333602 A1 | 9/1989 |
| EP | 0395548 A1 | 10/1990 |
| EP | 1114849 A1 | 7/2001 |
| EP | 2231917 A1 | 9/2010 |
| EP | 3530804 A1 | 8/2019 |
| GB | 1517595 | 7/1978 |
| JP | 08269115 A | 10/1996 |
| RU | 2 469 050 C2 | 12/2012 |
| RU | 2011 137 136 A | 3/2013 |
| WO | 0242344 A2 | 5/2002 |
| WO | 2007024683 A1 | 3/2007 |
| WO | 2008008868 A2 | 1/2008 |
| WO | 2008150647 A1 | 12/2008 |
| WO | 2010019338 A1 | 2/2010 |
| WO | 2016193646 A1 | 12/2016 |
| WO | 2017164726 A1 | 9/2017 |

OTHER PUBLICATIONS

Machine translation of Osumi et al. (JPH 08269115) (Year: 1996).*
International Search Report and Written Opinion for International Application No. PCT/EP2020/072341, dated Oct. 15, 2020, 9 pages.

* cited by examiner

*Primary Examiner* — Robert T Butcher
(74) *Attorney, Agent, or Firm* — Buchanan Ingersoll & Rooney PC

(57) ABSTRACT

The present invention relates to a polymer latex obtained from the emulsion polymerization in aqueous medium of a mixture of ethylenically unsaturated monomers comprising:
(a) more than 60 wt. % to 75 wt. % of at least one aliphatic conjugated diene
(b) 10 wt. % to 30 wt. % of at least one vinyl aromatic compound; and
(c) 0.5 to 5 wt. % of at least one ethylenically unsaturated silane bearing at least one silicon bonded hydrolysable group;
(d) 0.1 to 8 wt. % of at least one ethylenically unsaturated acid; and
(e) 0 to 20 wt. % of at least one further ethylenically unsaturated compound different from any of compounds (a) to (d),
the weight percentages being based on the total amount of monomers and add up to 100 wt. %, to a binder comprising said polymer latex and to a fiber structure fortified by said binder.

15 Claims, No Drawings

LATEX FOR BONDING FIBER STRUCTURES

CROSS-REFERENCE TO RELATED APPLICATION

This application is a National Phase application of International Application No. PCT/EP2020/072341, filed Aug. 10, 2020 which claims priority to and the benefit of Great Britain Application No. GB 1911659.9, filed Aug. 15, 2019, the entire disclosure of each of which is incorporated herein by reference for all purposes.

FIELD OF THE INVENTION

The present invention relates to a latex and in particular but not exclusively to a latex used as a binder for a fiber structure where the fiber structure is fortified by the latex.

BACKGROUND OF THE INVENTION

Binder fortified fiber structures are commonly used in areas such as construction applications. One example where binder fortified fiber structures are used in construction applications are exterior insulation finishing systems (EIFS). The fiber structure for this application is commonly a woven glass fiber structure. According to one approach frequently used in industry, the binder used to fortify the fiber structure comprises a polymer latex made from a monomer composition that contains self-crosslinking monomers for example N-methylolamide functional ethylenically unsaturated monomers. After application of the binder the fiber structure is heat cured to provide the desired mechanical strength and alkali resistance for the application in exterior insulation finishing systems. Thus, upon curing of the binder formaldehyde is released. Aminoplast resins as well as self-crosslinking N-methylolamide groups emit formaldehyde upon curing. Formaldehyde recently came under scrutiny by governmental organizations as being a potentially carcinogenic compound and might be classified as a hazardous compound. Thus, there is a need in industry for binders to be used to fortify fiber structures that do not release formaldehyde upon curing.

Furthermore, polymer latex binders are frequently used in other areas such as paper and card board applications for example to improve the wet tear strength of paper. Particularly, for hygiene papers that may come into contact with skin cross-linking systems that may generate hazardous compounds like formaldehyde or contain hazardous compounds like mobile crosslinkers that may leech during the intended use of the fiber structure like hygiene papers should be avoided.

WO 2008/008868 describes a fiber mat for building applications that is bonded by a binder comprising a formaldehyde free resin and a functional silane additive which is not part of the resin. Particularly, a binder is disclosed that comprises a styrene acrylate dispersion in combination with a polyol cross-linker and an aminosilane additive.

US 2011/0214796 relates to an adhesive comprising a styrene butadiene based aqueous dispersion and an epoxysilane. The styrene butadiene latex may comprise structural units from additional monomers such as ethylenically unsaturated silane monomers. Other suitable commoners include N-methylol (meth)acrylamide. But there is no disclosure of the use of that adhesive as binder to fortify a fiber structure or of binder fortified fiber structures.

WO 2008/150647 relates to fiber mats for building applications that are bonded by an aqueous binder composition comprising a urea formaldehyde resin and a polymer latex prepared from a monomer mixture comprising styrene, alkyl(meth)acrylate, acrylonitrile and an acrylamide. Due to the presence of the urea formaldehyde resin the binder will emit formaldehyde upon heat curing.

WO 2010/019338 discloses glass fiber mats bonded by a binder composition comprising a formaldehyde free binder that may be selected from an acrylic polyol, starch grafted styrene or acrylic modified polyvinyl acetate and a reactive hydrophobic additive such as stearyl acrylates, stearyl melamines, epoxidized fatty acid based oils and epoxy silanes.

WO 2016/193646 describes a binder composition for impregnating a glass fiber fabric comprising a silylated acrylic polymer obtained by copolymerizing alkyl(meth) acrylates and an ethylenically unsaturated silane monomer. Neither conjugated dienes nor vinyl aromatic compounds are mentioned as suitable comonomers. Thus, the latex polymer is restricted to purely (meth)acrylic polymers.

EP 1114849 relates to a polymer latex obtained by aqueous emulsion polymerization of a monomer mixture comprising conjugated dienes, vinyl aromatic compounds, ethylenically unsaturated carboxylic acids and a co-polymerizable self-crosslinking monomer selected from N-methylol(meth)acrylates). This latex is used as binder for fabrics in particular organic polymer fiber non-wovens to be used as bitumen impregnated roofing felts. The coated fiber structure exhibits excellent high temperature dimension stability as is required for the bitumen impregnation process and high temperature processing of the resulting roof sheeting.

WO 02/42344 discloses an aqueous dispersion of a core shell acrylic polymer obtained from one or more acrylic monomers whose corresponding homopolymer has a glass transition temperature (Tg) of less than 0° C., one or more acrylic monomers whose corresponding homopoylmer has a Tg of more than 0° C., one or more monomers containing at least two ethylenic unsaturations, vinyl alkoxy silanes, and ethylenically unsaturated carboxylic acids. The aqueous dispersion can be used for the impregnation of textiles. Construction application is nowhere mentioned.

WO 2007/024683 describes a wet-laid chopped strand glass mat for use in roofing applications formed by the application or inclusion of at least one coupling agent for example as part of a two part binder composition that includes the coupling agent. Preferred two part binders include the combination of a urea formaldehyde binder and a styrene butadiene binder. Preferred coupling agents are silanes and reactive siloxanes.

Thus, it is an object of the present invention to provide polymer latex and a binder composition comprising same to fortify a fiber structure that does not emit formaldehyde upon curing without compromising the required properties of the fortified fiber structure or to even improve the properties, such as or alkali resistance, abrasion resistance, solvent resistance, tensile strength and aging resistance. Furthermore, it is an object of the present invention to provide a binder composition that allows for lower curing temperatures and shorter curing times in the preparation of the binder fortified fiber structure in order to reduce energy consumption and increase throughput of an existing production line, without compromising the required properties of the fortified fiber structure.

SUMMARY OF THE INVENTION

One aspect of the present invention relates to a polymer latex obtained from the emulsion polymerization in aqueous medium of a mixture of ethylenically unsaturated monomers comprising:
- (a) more than 60 wt. % to 75 wt. % of at least one aliphatic conjugated diene
- (b) 10 wt. % to 30 wt. % of at least one vinyl aromatic compound; and
- (c) 0.5 to 5 wt. % of at least one ethylenically unsaturated silane bearing at least one silicon bonded hydrolysable group;
- (d) 0.1 to 8 wt. % of at least one ethylenically unsaturated acid; and
- (e) 0 to 20 wt. % of at least one further ethylenically unsaturated compound different from any of compounds (a) to (d), the weight percentages being based on the total amount of monomers and add up to 100 wt. %.

According to a further aspect the present invention relates to a binder comprising said polymer latex.

According to a further aspect the present invention relates to the use of said binder to fortify fiber structures and to fiber structures fortified by the binder according to the present invention.

It is still a further aspect of the present invention to use the fiber structures according to the present invention in a range of applications including construction applications, textiles and paper.

DETAILED DESCRIPTION OF THE INVENTION

The present invention will now be described in more detail.

Polymer Latex:

The polymer latex is obtained from the emulsion polymerization in aqueous medium of a mixture of ethylenically unsaturated monomers comprising:
- (a) more than 60 wt. % to 75 wt. % of at least one aliphatic conjugated diene
- (b) 10 wt. % to 30 wt. % of at least one vinyl aromatic compound; and
- (c) 0.5 to 5 wt. % of at least one ethylenically unsaturated silane bearing at least one silicon bonded hydrolysable group;
- (d) 0.1 to 8 wt. % of at least one ethylenically unsaturated acid; and
- (e) 0 to 20 wt. % of at least one further ethylenically unsaturated compound different from any of compounds (a) to (d), the weight percentages being based on the total amount of monomers and add up to 100 wt. %.

Due to the presence of the ethylenically unsaturated silane bearing at least one silicon bonded hydrolysable group the binder has self-crosslinking properties, whereby upon crosslinking no hazardous components such as formaldehyde will be emitted. Suitable silicon bonded hydrolysable groups according to the present invention may be alkoxy groups, acyloxy groups, halogen groups or combinations thereof. Preferred hydrolysable groups are alkoxy groups, in particular methoxy and ethoxy groups.

Thus, suitable ethylenically unsaturated silanes bearing at least one silicon bonded hydrolysable group according to the present invention may be selected from γ-(meth)acryloxypropyl trimethoxysilane, γ-(meth)acryloxypropyl triethoxysilane, γ-methacryloxypropyl methyldimethoxysilane, γ-(meth)acryloxypropyl dimethylmethoxysilane, γ-(meth)acryloxypropyl methyldiethoxysilane, γ-(meth)acryloxypropyl dimethylethoxysilane, 3-(N-allylamino)propyl trimethoxysilane, allyltrimethoxysilane, allyltriethoxysilane, 3-aminophenoxydimethylvinylsilane, 4-aminophenoxydimethylvinylsilane, 3-(3-aminopropoxy)-3,3-dimethyl-1-propenyl trimethoxysilane, butenyltriethoxysilane, butenyltrimethoxysilane, 2-(chloromethyl)ally trimethoxysilane, decosenyltriethoxysilane, (meth)acryloxyethoxy trimethoxysilane, (meth)acryloxyethoxy triethoxysilane, (meth)acryloxyethoxy methyldimethoxysilane, (meth)acryloxyethoxy methyldiethoxysilane, (meth)acryloxymethyl trimethoxysilane, (meth)acryloxymethyl methyldimethoxysilane, (meth)acryloxymethyl triethoxysilane, (meth)acryloxymethyl methyldiethoxysilane, γ-(meth)acryloxypropyl tris(methoxyethoxy)silane, 7-octenyl trimethxysilane, 7-octenyl triethxysilane, allylmethyldimethoxysilane, vinyltrimethoxysilane, vinyltriethoxysilane, vinylmethyldimethoxysilane, vinylmethyldimethoxysilane, vinyl dimethylethoxysilane, vinyl dimethylmethoxysilane, vinyltriacetoxysilane, vinylmethyl diacetoxasilane, and combinations thereof.

Particularly suitable ethylenically unsaturated silanes bearing at least one silicon bonded hydrolysable group are selected from γ-(meth)acryloxypropyl trimethoxysilane, (meth)acryloxypropyl triethoxysilane, γ-(meth)acryloxypropyl methyldimethoxysilane, (meth)acryloxypropyl dimethylmethoxysilane, 3-(N-allylamino)propyl trimethoxysilane, allyltrimethoxysilane, allyltriethoxysilane, allylmethyldimethoxysilane, vinyltrimethoxysilane, vinyltriethoxysilane, vinylmethyldimethoxysilane and combinations thereof. γ-methacryloxypropyl trimethoxysilane is particularly preferred.

According to the present invention the mixture of ethylenically unsaturated monomers may comprise:
- (a) 61 to 70 wt. % of at least one aliphatic conjugated diene;
- (b) 15 to 30 wt. % of at least one aromatic vinyl compound;
- (c) 0.5 to 5 wt. % of at least one ethylenically unsaturated silane bearing at least one silicon bonded hydrolysable group;
- (d) 0.1 to 7 wt. % of at least one ethylenically unsaturated acid; and
- (e) 0 to 20 wt. % of at least one further ethylenically unsaturated compound different from any of compounds (a) to (d), the weight percentages being based on the total amount of monomers and add up to 100 wt. %.

The mixture of ethylenically unsaturated monomers may comprise:
- (a) 62 to 68 wt. % of at least one aliphatic conjugated diene;
- (b) 20 to 30 wt. % of at least one aromatic vinyl compound;
- (c) 0.5 to 5 wt. % of at least one ethylenically unsaturated silane bearing at least one silicon bonded hydrolysable group;
- (d) 0.1 to 6 wt. % of at least one ethylenically unsaturated acid; and
- (e) 0 to 20 wt. % of at least one further ethylenically unsaturated compound different from any of compounds (a) to (d).

Conjugated diene monomers suitable for the preparation of the latices according to the present invention include conjugated diene monomers, selected from 1,3-butadiene, isoprene and 2,3-dimethyl-1,3-butadiene. 1,3-butadiene is the preferred conjugated diene according to the present invention. Typically, the amount of conjugated diene monomer ranges from more than 60 to 75 wt. %, preferably from 61 to 70 wt. %, more preferred from 62 to 68 wt. %, and most preferred from 63 to 68 wt. %, based on the total weight of monomers. Thus, the conjugated diene may be present in amounts of more than 60 wt. %, at least 61, wt. %, at least 62 wt. %, at least 63 wt. %, at least 64 wt. %, or at least 65, wt. %, based on the total weight of the ethylenically unsaturated monomers.

Accordingly, the conjugated diene monomers can be used in amounts of no more than 75 wt. %, no more than 74 wt. %, no more than 73 wt. %, no more than 72 wt. %, no more than 71 wt. %, no more than 70 wt. %, no more than 69 wt. %, no more than 68 wt. %, no more than 67 wt. %.

A person skilled in the art will appreciate that any range between any of the explicitly disclosed lower and upper limit is herein disclosed.

Representative examples of vinyl-aromatic monomers include, styrene, α-methylstyrene, p-methylstyrene, t-butylstyrene and 2-vinyltoluene. Mixtures of one or more of the vinyl-aromatic compounds may also be used. The preferred monomers are styrene and α-methylstyrene. The vinyl-aromatic compounds can be used in a range of from 10 to 30 wt. %, preferably from 12 to 30 wt. %, or from 20 to 30 wt. %, based on the total weight of ethylenically unsaturated monomers. Thus, the vinyl-aromatic compound can be present in an amount of at least 10 wt. %, at least 11 wt. %, at least 12 wt. %, at least 13 wt. %, at least 14 wt. %, at least 15 wt. %, at least 16 wt. %, at least 17 wt. %, at least 18 wt. %, at least 19 wt. %, at least 20 wt. %, at least 21 wt. %, at least 22 wt. %, at least 23 wt. %, at least 24 wt. %, at least 25 wt. %, at least 26 wt. %, at least 27 wt. %. Likewise, the vinyl-aromatic compounds can be present in an amount of no more than 30 wt. %, no more than 29 wt. %, no more than 28 wt. % based on the total weight of ethylenically unsaturated monomers. A person skilled in the art will appreciate that any range between one of the explicitly disclosed lower limits and upper limits is disclosed herein.

Typically, the amount of the ethylenically unsaturated silane bearing at least one silicon bonded hydrolysable group is 0.5 to 5.0 wt. %, preferably 1.5 to 5.0 wt. %, more preferred 2.0 wt. % to 5.0 wt. %, even more preferred 2.0 wt. % to 4.0 wt. % or 2.0 wt. % to 3.0 wt. % based on the total amount of monomers. Thus, ethylenically unsaturated silane bearing at least one silicon bonded hydrolysable group can be present in an amount of at least 0.5 wt. %, at least 1.0 wt. %, at least 1.5 wt. %, or at least 2.0 wt. %. Amounts of at least 2.0 wt. % contribute to a reduced tackiness of the latex. Likewise, the ethylenically unsaturated silane bearing at least one silicon bonded hydrolysable group can be present in an amount of no more than 5 wt. %, no more than 4.5 wt. %, no more than 4.0 wt. %, no more than 3.5 wt. %, no more than 3.0 wt. %, based on the total weight of ethylenically unsaturated monomers. A person skilled in the art will appreciate that any range between one of the explicitly disclosed lower limits and upper limits is disclosed herein.

The ethylenically unsaturated carboxylic acid monomers suitable for use in the present invention include monocarboxylic acid and dicarboxylic acid monomers and monoesters of dicarboxylic acid. Carrying out the present invention it is preferable to use ethylenically unsaturated aliphatic mono- or dicarboxylic acids or anhydrides which contain from 3 to 5 carbon atoms. Examples of monocarboxylic acid monomers include an acrylic acid, methacrylic acid, crotonic acid and examples of dicarboxylic acid monomers include fumaric acid, itaconic acid, maleic acid and maleic anhydride. Examples of other suitable ethylenically unsaturated acids include vinyl acetic acid, vinyl lactic acid, vinyl sulfonic acid, 2-Methyl-2-propene-1-sulfonic acid styrene sulfonic acid, acrylamidomethyl propane sulfonic acid and the salts thereof.

The use of ethylenically unsaturated acid monomers influences the properties of the polymer dispersion and of the coating produced thereof. The type and the amount of these monomers are determined thereby. Generally, such an amount is from 0.1 to 8 wt. %, preferably from 1 to 8 wt. %, more preferred from 1 to 7 wt. %, even more preferred from 1 to 6 wt. % or from 1 to 5 wt. % based on the total weight of the ethylenically unsaturated monomers. Thus, the ethylenically unsaturated acid monomers may be present in amounts of at least 0.1 wt. %, at least 0.3 wt. %, at least 0.5 wt. %, at least 0.7 wt. %, at least 0.9 wt. %, at least 1 wt. %, at least 1.2 wt. %, at least 1.4 wt. %, at least 1.6 wt. %, at least 1.8 wt. %, at least 2 wt. %. Likewise, the ethylenically unsaturated acid monomers may be present in amounts of no more than 8 wt. %, no more than 7.5 wt. %, no more than 7 wt. %, no more than 6.5 wt. %, or no more than 6 wt. % no more than 5.5 wt. %, no more than 5 wt. %, or no more than 4.5 wt. %, based on the total weight of ethylenically unsaturated monomers. A person skilled in the art will appreciate that any range defined by an explicitly disclosed lower limit and an explicitly disclosed upper limit is disclosed herewith.

Optionally, the ethylenically unsaturated monomer used in the free-radical emulsion polymerization to form the polymer latex to be used according to the present invention may include additional ethylenically unsaturated monomers that are different from the above-defined monomers a) to d). These monomers may be selected from alkylesters or hydroxy alkyl esters of (meth)acrylic acid, vinyl esters, unsaturated nitriles and amides of ethylenically unsaturated acids.

Nitrile monomers which can be used in the present invention include polymerizable unsaturated aliphatic nitrile monomers which contain from 2 to 4 carbon atoms in a linear or branched arrangement, which may be substituted either by acetyl or additional nitrile groups. Such nitrile monomers include acrylonitrile, methacrylonitrile and fumaronitrile, with acrylonitrile being most preferred. These nitrile monomers can be included in amounts of up to 20 wt. %, preferably from 0.5 to 15 wt. %, and more preferred from 1 to 12 wt. %, even more preferred from 1 to 12 wt. % based on the total weight of ethylenically unsaturated monomers.

Vinyl ester monomers which can be used according to the present invention include vinyl acetate, vinyl proprionate, vinyl butyrate, vinyl benzoate, vinyl-2-ethylhexanoate, vinyl stearate, and the vinyl esters of versatic acid. The most preferred vinyl ester monomers for use in the present invention is vinyl acetate. Typically, the amount of vinyl ester monomers that may be present in the emulsion polymerization for making the polymer latex according to the present invention ranges from 0 to 20 wt. %, preferably from 0 to 15 wt. %, more preferred 0 to 10 wt. % or 0 to 5 wt. % based on the total weight of ethylenically unsaturated monomers.

Esters of (meth)acrylic acid that can be used according to the present invention include n-alkyl esters, iso-alkyl esters or tert-alkyl esters of acrylic or (meth)acrylic acid in which the alkyl group has from 1 to 20 carbon atoms, the reaction product of methacrylic acid with glycidyl ester of a neoacid such as versatic acid, neodecanoic acid or pyvalic acid and hydroxyalkyl (meth)acrylate and alkoxyalkyl (meth)acrylate monomers.

In general, the preferred alkyl esters of (meth)acrylic acids may be selected from $C_1$-$C_{10}$ alkyl (meth)acrylate, preferably $C_1$-$C_{10}$-alkyl (meth)acrylates. Examples of such acrylate monomers include n-butyl acrylate, secondary butyl acrylate, ethyl acrylate, hexyl acrylate, tert-butyl acrylate, 2-ethylhexyl acrylate, isooctyl acrylate, 4-methyl-2-pentyl acrylate, 2-methylbutyl acrylate, methyl methacrylate, butyl methacrylate, n-butyl methacrylate, isobutyl methacrylate, ethyl methacrylate, isopropyl methacrylate, hexyl methacrylate, cyclohexyl methacrylate and cetyl methacrylate. Typically, the amount of alkyl (meth)acrylate monomers which are present in the polymeric phase depends on the monomer chosen, but is typically in the range of 0 to 20 wt. %, preferably from 0 to 15 wt. %, more preferred from 0 to 10 wt. %, even more preferred 0 to 8 wt. % or 0 to 5 wt. %. based on the total amount of ethylenically unsaturated monomers. Lower limits for the content of alkyl esters of (meth)acrylic acids may be 0.5 wt. %, or 1.0 wt. %, or 1.5 wt. % or 2.0 wt. %. It is most preferred if the monomer composition does not contain alkyl esters of (meth)acrylic acids.

The hydroxy alkyl(meth)acrylate monomers which can be used to prepare the polymer latex according to the present invention include hydroxyalkyl acrylate and methacrylate monomers which are based on ethylene oxide, propylene oxide and higher alkylene oxides or mixtures thereof. Examples are hydroxyethyl acrylate, hydroxypropyl acrylate, hydroxyethyl methacrylate, hydroxypropyl methacrylate and hydroxybutyl acrylate. Typically, the amount of hydroxy alkyl (meth)acrylate monomer present in the polymeric phase depends on the monomer chosen, but the typical range is from 0 to 15 wt. %, preferably from 0 to 10 wt. %, based on the total weight of ethylenically unsaturated monomers. It is most preferred if the monomer composition does not contain hydroxy alkyl(meth)acrylate monomers.

Alkoxyalkyl (meth)acrylate monomers which can be used in the present invention include methoxyethyl methacrylate, ethoxyethyl methacrylate, methoxyethyl methacrylate, ethoxyethyl acrylate, butoxyethyl methacrylate, methoxybutyl acrylate and methoxyethoxyethyl acrylate. Preferred alkoxyalkyl(meth)acrylate monomers are ethoxyethyl acrylate and methoxyethyl acrylate. Typically, the amount of alkoxyethyl alkyl (meth)acrylate monomers which is present in the polymeric phase depends on the monomer chosen, but the typical range is from 0 to 15 wt. %, preferably from 0 to 10 wt. %, based on the total weight of ethylenically unsaturated monomers. It is most preferred if the monomer composition does not contain alkoxyalkyl (meth)acrylate monomers.

Amides of ethylenically unsaturated acids that can be used for the preparation of the polymer latex to be used according to the present invention include acrylamide, methacrylamide, and diacetone acrylamide. The preferred amide monomer is methacrylamide and acrylamide. Typically, the amount of amides of ethylenically unsaturated acid is in the range of from 0 to 10 wt. %, preferably from 0.5 to 5 wt. %, even more preferred 0.5 to 4 wt. % or 1 to 3.5 wt. % most preferred from 1 to 3 wt. %, based on the total weight of ethylenically unsaturated monomers.

In general, the polymer latex composition of the present invention can be prepared by polymerization processes which are known in the technical area, and in particular by the known latex emulsion polymerization processes, including a latex polymerization carried out with seeds (seed latex)

and a latex polymerization not carried out with seed latex. Representative processes include those which are described in U.S. Pat. Nos. 4,478,974; 4,751,111; 4,968,740; 3,563, 946; 3,575,913; and DE-A-19 05 256. Such processes can be adapted for the polymerization of the monomers described above. The seed latex, where used, is preferably based on a carboxylated styrene copolymer, as exemplified in WO2017164726A1. The method for introducing the monomers and other ingredients, such as polymerization assistants, is not particularly critical. The polymerization is then carried out under conventional conditions until the desired conversion of monomer in to polymer has been reached. Crosslinking agents and adjuvants for latex polymerization, such as initiators, surfactants, bases, buffers and emulsifiers, can be used depending on requirements.

The process for the preparation of the above-described polymer latex can be performed at temperatures of from 0 to 130° C., preferably of from 60 to 130° C., particularly preferably of from 60 to 100° C., very particularly preferably of from 70 to 90° C., in the presence of no or one or more emulsifiers and one or more initiators, such as, for example, preferably sodium persulfate or ammonium persulfate. The temperature includes all values and sub-values there between, especially including 5, 10, 15, 20, 25, 30, 35, 40, 45, 50, 55, 60, 65, 70, 75, 80, 85, 90, 95, 100, 105, 110, 115, 120 and 125° C.

The manner in which the monomers are introduced to the reaction mixture is not particularly limited. The emulsion polymerization according to the present invention can accordingly be carried out for example with monomer feed in batch, pseudobatch or continuous mode. It is also possible to create an SBR based polymer where styrene and butadiene groups are present in a "block" formation, namely a [p(Sty)-b-p(1,3-BD)]-g-MEMO with small amounts of other monomers between block formations.

Initiators which can be used when carrying out the present invention include water-soluble and/or oil-soluble initiators which are effective for the purposes of the polymerization. Representative initiators are well known in the technical area and include, for example: azo compounds (such as, for example, AIBN, AMBN and cyanovaleric acid), inorganic peroxy compounds such as hydrogen peroxide, sodium, potassium and ammonium peroxydisulfate, peroxycarbonates and peroxyborates, as well as organic peroxy compounds such as alkyl hydroperoxides, dialkyl peroxides, acyl hydroperoxides, and diacyl peroxides, as well as esters such as tertiary butyl perbenzoate and combinations of inorganic and organic initiators. Most preferred are the inorganic persulfates such as, for example, potassium persulfate, sodium persulfate and ammonium persulfate.

The initiator is used in a sufficient amount to initiate the polymerization reaction at a desired rate. In general, an amount of initiator of from 0.05 to 5, preferably of from 0.1 to 4%, by weight, based on the weight of the total polymer, is sufficient. The amount of initiator is most preferably of from 0.1 to 3% by weight, based on the total weight of the polymer. The amount of initiator includes all values and subvalues there between, especially including 0.1, 0.5, 1, 1.5, 2, 2.5, 3, 3.5, 4 and 4.5% by weight, based on the total weight of the polymer.

The above mentioned inorganic and organic peroxy compounds may be used alone or in combination with one or more suitable reducing agents as is well known in the art. Examples of such reducing agents which may be mentioned are sulfur dioxide, alkali metal disulfites, alkali metal and ammonium hydrogen sulfites, thiosulfates and dithionites, as well as hydroxylamine hydrochloride, hydrazine sulfate, iron (II) sulfate, cuprous naphthanate, glucose, sulfonic acid compounds such as sodium methane sulfonate, amine compounds such as dimethylaniline and ascorbic acid. The quantity of the reducing agent is preferably 0.03 to 10 parts by weight per part by weight of the polymerization initiator.

Surfactants or emulsifiers which are suitable for stabilizing the latex particles include those conventional surface-active agents for polymerization processes. The surfactant or surfactants can be added to the aqueous phase and/or the monomer phase. An effective amount of surfactant in a seed process is the amount which was chosen for supporting the stabilization of the particle as a colloid, the minimization of contact between the particles and the prevention of coagulation. In a non-seeded process, an effective amount of surfactant is the amount which was chosen for influencing the particle size. The surfactant may be anionic, non-ionic, cationic, amphoteric or zwitterionic in nature, most preferred are anionic or non-ionic surfactants, or combinations thereof.

Representative surfactants include saturated and ethylenically unsaturated sulfonic acids or salts thereof, including, for example, unsaturated hydrocarbonsulfonic acid, such as vinylsulfonic acid, allylsulfonic acid and methallylsulfonic acid, and salts thereof; aromatic hydrocarbon acids, such as, for example, p-styrenesulfonic acid, isopropenylbenzenesulfonic acid and vinyloxybenzenesulfonic acid and salts thereof; sulfoalkyl esters of acrylic acid and methacrylic acid, such as, for example, sulfoethyl methacrylate and sulfopropyl methacrylate and salts thereof, and 2-acrylamido-2-methylpropanesulfonic acid and salts thereof; alkylated diphenyl oxide disulfonates, sodium dodecylbenzenesulfonates and dihexyl esters of sodium sulfosuccinate, ethoxylated alkylphenols and ethoxylated alcohols; fatty alcohol (poly)ethersulfates.

The type and the amount of the surfactant is governed typically by the number of particles, their size and their composition. Typically, the surfactant is used in amounts of from 0 to 10, preferably from 0 to 5, more preferably from 0 to 3 parts by weight, based on the total weight of the monomers. The amount of surfactant includes all values and subvalues therebetween, especially including 0, 0.1, 0.5, 1, 2, 3, 4, 5, 6, 7, 8, 9 and 10 parts by weight based on the total weight of the monomer. According to one embodiment of the present invention the polymerization is conducted without using surfactants.

Various protective colloids can also be used instead of or in addition to the surfactants described above. Suitable colloids include polyhydroxy compounds, such as partially acetylated polyvinyl alcohol, casein, hydroxyethyl starch, carboxymethylcellulose, hydroxyethylcellulose, hydroxypropylcellulose, polyethylene glycol and gum arabic. The preferred protective colloids are carboxymethylcellulose, hydroxyethylcellulose and hydroxypropylcellulose.

Furthermore, the polymerization of the monomer mixture can be conducted in presence of a degraded polysaccharide (also known as dextrin). Any degraded starch can be employed. Where used, it is preferred if the degraded starch has a dextrose equivalent DE of 15 to 70 measured according to ISO 5377 (1981-12-15). The term "polysaccharide" encompasses polysaccharides and oligosaccharides. Suitable examples are glucose syrup, commercially available from e.g Cargill Deutschland GmbH, Krefeld, Germany or Roquette, Lestrem, France and other alternatives of degraded polysaccharides that can be used according to the present invention.

In general, these protective colloids are used in contents of from 0 to 10, preferably from 0 to 5, more preferably from 0 to 2, parts by weight, based on the total weight of the monomers. The amount of protective colloids includes all values and subvalues therebetween, especially including 1, 2, 3, 4, 5, 6, 7, 8 and 9 parts by weight, based on the total weight of the monomers.

Other auxiliary agents frequently used in conventional emulsion polymerization processes can also be used in the preparation of the polymer latexes of the present invention depending on requirements. Such further auxiliary agents include, without being limited thereto, pH regulators, buffer substances, chelating agents, chain transfer agents and short stopping agents.

Non-limiting examples of suitable buffer substances are for instance alkali metal carbonates and hydrogen carbonates, phosphates and pyrophosphates. Suitable chelating agents can be exemplified by alkali metal salts of ethylenediaminetetraacetic acid (EDTA) or hydroxyl-2-ethylenediaminetriacetic acid (HEEDTA). The quantity of buffer substances and chelating agents is usually 0.001-1 weight percent, based on the total amount of monomers.

Chain transfer agents may be used for controlling the average molecular weight of the polymer chains formed in the emulsion polymerization process. Non-limiting examples of suitable chain transfer agents are organic sulfur compounds such as thioesters, for example alkylthioesters such as ethyl thioacetate, propyl thioacetate, ethyl thiopropionate, lauryl thiopropionate, methyl thiobutyrate, propyl thiobutyrate; alkyl thioglycolates such as, butylthioglycolate, hexylthioglycolate, laurylthioglycolate, 2-ethylhexylthioglycolate and isooctyl thioglycolate and thiopropionates, and the like; di-mercaptans (e.g. 1,2-ethane-dithiol) and alkyl ethers such as 2-mercaptoethyl ether. Alternatively, or additionally 2-mercaptoethanol, 3-mercaptopropionic acid and $C_1$-$C_{12}$ alkyl mercaptans may be used, whereof n-dodecylmercaptan and t-dodecylmercaptan are preferred. The quantity of chain transfer agents, if present, is usually 0.05-3.0 weight percent, preferably 0.2-2.0 weight percent, based on the total amount of the monomers.

Furthermore, it can be beneficial to introduce partial neutralization to the polymerization process. A person skilled in the art will appreciate that by appropriate selections of this parameter the necessary control can be achieved.

Various other additives and ingredients can be added in order to prepare the latex composition of the present invention. Such additives include, for example: buffers, antifoams, wetting agents, thickeners, plasticizers, fillers, pigments, dispersants, optical brighteners, crosslinking agents, antioxidants, hydrophobizing agents and metal chelating agents. Known antifoams include silicone oils and acetylene glycols. Customary known wetting agents include alkylphenol ethoxylates, alkali metal dialkylsulfosuccinates, acetylene glycols and alkali metal alkylsulfates. Typical thickeners include polyacrylates, polyacrylamides, xanthan gums, modified celluloses or particulate thickeners, such as silicas and clays. Typical plasticizers include mineral oil, liquid polybutenes, liquid polyacrylates and lanolin. Preferably a high molecular weight plasticizer is not used, more preferably no plasticizer is used. Zinc oxide, titanium dioxide, aluminum hydroxide (also known as aluminum trihydroxide), calcium carbonate and clay are the fillers typically used. The hydrophobizing agent may be a fatty compound such as a C8-22 fatty acids, C8-22 fatty acid amides, C8-22 fatty acid esters with C1-8 monohydric alcohol(s), C8-22 fatty acid esters of glycol(s), C8-22 fatty acid esters of polyglycol(s), C8-22 fatty acid esters of polyalkylene glycol(s), C8-22 fatty acid esters of glycerol, C8-22 fatty acid esters of mono-, di-, or triethanolamine(s), and C8-22 fatty acid esters of monosaccharide(s). Preferably no fatty compound is used in the binder formation. The filler may, or may not act as a fire retardant component. The filler may or may not act as a pigment; colorants, dyes and pigments may be present instead of, or in addition to the filler. Preferably a non-reinforcing filler is not present in the man-made fibers fortified by a binder.

Binder:

The binder according to the present invention comprises the polymer latex as described above. The binder may contain additional components such as co-binders and cross-linking agents as long as these additional components do not emit formaldehyde upon curing. As a consequence, the binders to be used according to the present invention do preferably not contain any formaldehyde resins. It is particularly preferred, if the binder does not contain any additional resinous components.

In order to optimize the properties of the binder to be used according to the present invention additional components might be present. For example, the binder may comprise at least one organosilane cross-linking agent for example monomeric epoxy-functional silanes, or the reaction products thereof. The at least one organosilane cross-linking agent may comprise at least one organyl group having one or more pendant functional group(s) reactive with the active hydrogen-containing functional groups of monomer(s), if present, wherein preferably the reactive functional group(s) of the organosilane cross-linking agent is/are each independently selected from epoxy, isocyanate, amino, thiol, halogen, ureido, sulfonic acid, carboxylic acid and anhydride. Wherein the at least one organosilane cross-linking agent further comprises at least one hydrolysable group capable of forming a silanol group, the at least one hydrolysable group being preferably selected from alkoxy, acyloxy or halogen. Suitable compounds are 3-glycidoxy propyl functional alkoxy silanes. But it is preferred if the binder is free of epoxy functional silanes.

Alternatively, or additionally, at-least some of the silanol containing groups may be grafted onto the latex post-polymerisation in-situ before termination/residual monomer stripping, or fed in towards the end of the polymerization where trace monomers are still present in the polymer latex, or after the exotherm peak, to create a core-shell configuration. Such a graft may comprise an ethylenically unsaturated silane bearing at least one silicon bonded hydrolysable group. This type of grafting can be effected by use of an oxidizing agent to effect a graft reaction between the ethylenically unsaturated group of the siloxane and a side chain or terminal chain unsaturated group of the SBR polymer. But, for ease of manufacture, it is preferred if the binder is free of such grafted functional silanes and it is preferred that the binder comprising a polymer latex is free of further siloxane compounds as curing additives that are not initially present in the polymer chain.

Where strong adhesion between fiber and binder is prioritized, there exists the pre-treatment of a fiber glass or silica fiber with a monomeric alkoxy silane followed by a curing step in-order to silanize the glass fiber before the binder is applied. This embodiment is less preferential.

Although it is outside the scope of this invention, the skilled addressee will understand that it is also possible to omit silanization of the polymer during copolymerization of an SBR or XSBR based polymer, and include siloxane bearing groups after termination and before or after removal of the (X)SBR based polymer from the polymerization tank, and/or before or after a residual monomer stripping step, and/or before or after resuspension of the (X)SBR based polymer in a known graft polymer technique involving oxidizing agents, an (X)SBR based polymer, and one of; ethylenically unsaturated siloxanes, amine functional siloxanes, glycidyl functional siloxanes, carboxylic acid functional siloxanes, or hydroxyl functional siloxanes. Such an approach has the disadvantage of being a multi-step process, with difficulties relating to un-selective grafting, unwanted side reactions, high reaction initiation temperatures potentially requiring other unwanted catalyzing agents present in the final composition.

In one embodiment acid or base catalysts which lower the activation energy of the hydrolysis or silanol condensation reaction may also be present. The catalysts promote the initial hydrolysis before drying of the binder. Effective catalysts may be acetic acid, mineral acids, lewis acids, tin-based catalysts, alkali metal or alkali earth metal compounds and chelating co-catalysts thereof, as disclosed in U.S. Pat. No. 6,313,253B1.

In another embodiment it is possible to use photocuring to create silane bonds from siloxanes. Typically, a photoinitiator is used in combination with UV irradiation to achieve curing of the fiber matt or mesh at room temperature, in the presence or absence of an aprotic solvent. A photocuring step is typically performed in an inert atmosphere, or sub-aerobic atmosphere to prevent photocuring inhibition, such as Irgacure®819, preferably with monochromatic light of wavelength 360 nm to 380 nm. Such an embodiment is considered to be fully cured upon end of exothermic release.

A suitable surface tension for the binder according to the present invention may be in the range of 20 to 52 mN/m, preferably 23 to 45 mN/m, more preferred 25 to 42 mN/m and most preferred from 28 to 38 mN/m, measured according to ISO 1409 at 23° C. As will be appreciated by a person skilled in art the suitable surface tension can be adjusted by the addition of surfactants and/or wetting agents in the appropriate amounts to adjust the desired surface tension. Preferred surfactants or wetting agents are sodium dioctyl sulfo succinate, sodium dinonyl sulfosuccinate and an ethoxylated mixture of straight chain C9-C11 alcohols. Also, the salts of dialkyl sulfosuccinates useful in this invention are the ammonium salt and the alkali metal, particularly sodium and potassium, salts of a dialkyl ester of sulfosuccinic acid.

Fiber Structure

The fiber structure according to the present invention may comprise natural fibers like cellulose type fibers as are frequently used in paper or card board. Other fiber structures include textiles, both woven and non woven. The binder according to the present invention is particularly suitable to fortify textile fiber structures comprising man-made fibers. The man-made fibers may have a ratio of the longest measurable dimension to the shortest measurable dimension to be more than 5:1. Preferably the man-made fibers of this invention have a ratio of 10:1, more preferably above 20:1, more preferably above 50:1. Thus, coatings and adhesives for agglomerating particles which approach sphericity are not within the scope of the present invention. In one embodiment where the textile fibers are present as a woven mesh, with binder applied at the cross-over points, the preferred ratio for an individual man-made fiber may be significantly larger than 500:1.

According to the present invention the longest dimension is preferably over 100 nm in length, more preferred still over 200 nm in length, more preferred still over 500 nm in length, more preferred still over 1 micron in length. The coating and curing of nano-rod materials is not a preferred embodiment.

According to the present invention the man-made fiber may comprise an organic polymer man-made fiber, which may include polyester, such as hydroxy functionalized polyester or polyethylene terephthalate, polyetherester, polyurethane, polybutylene terephthalate, hydroxyl functionalized polyolefins such as (meth)acrylic acid-g-propylene, polyvinyl alcohol or it's acetals or ketals, nylon 6, nylon 66, polyethylene, polypropylene, poly arylene sulphide, polyether ether ketone, graphitic carbon, particularly activated fibrous carbon, glassy carbon fiber, graphite-epoxy blends, fullerne type carbon, acrylic fibers, modacrylic fibers, aramid or kevlar fibers, nomex fibers, spandex fibers, poly acrylonitrile, chemically modified polycarbonate fibers, chemically treated vinylidine fibers, chemically treated vinyon or saran PVC fibers, artificial polyisoprene or combinations thereof.

Artificial versions of natural fibers; including artificial cellulose fibers, artificial cellulose acetate, artificial cellulose triacetate, artificial alginate fibers, polylactone fibers, polycasein fibers, polyglobulin fibers, polyurea, polylactide fibers, or artificial fibers produced by polymerizing polypeptides, amino acids to produce carboxamide linkages fall also within the term man-made fibers according to the present invention.

Suitable inorganic man-made fiber according to the present invention may include mineral man-made in-organic fibers such as ceramic fibers, basalt fiber, asbestos fiber, slag wool, stone wool, refractory ceramic fibers such as kaowool.

According to the present invention the man-made fiber preferably comprises polyester, preferably hydroxy-functionalised polyester or fiber-glass. Preferred examples of fiber glasses are alkali earth silicate wool, with CaO and MgO additives, particularly preferred are E-Glass, containing additional Alumina, and alkali-resistant or AR-Glass, containing Zirconia and $Na_2O$ instead of CaO. Less preferred fiber glasses are C-glass, A-glass, borosilicate D-glass, E-CR-glass, R-glass, S-glass quartz and S-2-Glass. The fibers can be amorphous or crystalline. Where the man-made fibers are fiber-glass it is preferred if the amount of silica is more than 40 wt. %, more preferred more than 50 wt. %, most preferred more than 55 wt. % silica. Where the man-made fibers comprise hydroxy functionalized polyester the amount of hydroxy functionalized polyester is preferably more than 70 wt. % polyester, more preferred more than 80 wt. % and most preferred more than 90 wt. %.

The skilled person will appreciate that the binders described herein can be used to treat natural fibers which have been purified, chemically or thermally treated, or treated as produced. Examples of fibers that can be treated include sisal fibers, hemp fibers, Solka-Floc® Powdered Cellulose, cellulose xanthate, or any viscose process treatment of natural fibers, or side product thereof for example lignin fibers, or any product resulting from treating fiber containing biomass with pulp liquors, or saponified acetate process. Unmodified natural fibers such as silk, cotton or jute fiber can be cured with the binder. Alternately the binder may cure animal by-product based fibers such as collagen or keratin. Particularly fibers presenting hydroxyl functionalities and/or carboxy functionalities can yield green strength with addition of bivalent metal ions, otherwise chemical modification may be required.

Or one or more of the any of the above organic man-made fibers, artificial versions of natural fibers or inorganic man-made fiber, may be present as a blend fiber.

Alternatively, or additionally it is possible to apply the binder to the fibers at their terminal end in order to set them into a thermally stable substrate in a "carpet-like configuration" then curing the binder to create a surface of long free-flowing fiberous material, extending perpendicularly from the substrate on one or both sides of the substrate.

Alternatively, or additionally individual fibers can be uniformly orientated and bound in a bunch using the binder of this invention to at-least partially cure groups of partially orientated fibers to achieve improved microelasticity in composite materials.

According to an aspect of the, invention, the binder may be compatible with certain fibers as a concentric coating in a melt extrusion process. In certain embodiments the binder can act as a temporary binder, coalescing a metal and/or mixed metal oxide wool prior to flash sintering. In preferred embodiments that is not the case. Without wishing to be bound by theory, in fiber chemistries where covalent bond formation with a siloxane in the binder polymer is not possible due to the absence of bond forming groups on the man-made fiber surface, for example noble metal man-made fibers, and the primary mode of adhesion to the surface is physisorption, in this case the skilled addressee will understand that a preferred embodiment for coating the fibers is that of a unified matt with substantially no gaps between the binder and filamentary material, in order to prevent the peeling or de-adhesion of the binder from the surface of man-made fiber upon dry curing.

According to one aspect of the invention the latex as described herein can be used in paper or card board application.

According to one embodiment of the present invention that is particularly suitable for bonding of a woven structure of glass fibers that can be advantageously used for exterior insulation finishing systems the mixture of ethylenically unsaturated monomers to be used to prepare the polymer latex comprises:

- (a) more than 60 wt. % to 75 wt. % of at least one aliphatic conjugated diene, preferably butadiene;
- (b) 10 to 30 wt. % of at least one aromatic vinyl compound, preferably styrene;
- (c) 0.5 to 5 wt. % of at least one ethylenically unsaturated silane bearing at least one silicon bonded hydrolysable group, preferably ɣ-methacryloxypropyl trimethoxysilane;
- (d) 0.1 to 8 wt. % of at least one ethylenically unsaturated acid, preferably a combination of acrylic acid and itaconic acid;
- (e1) 0 to 10 wt. % of at least one ethylenically unsaturated nitrile, preferably acrylonitrile; and
- (e2) 0.5 to 5 wt. % of at least one amide of an ethylenically unsaturated acid, preferably methacrylamide, preferably
- (a) 61 to 70 wt. % of at least one aliphatic conjugated diene, preferably butadiene;
- (b) 15 to 30 wt. % of at least one aromatic vinyl compound, preferably styrene;
- (c) 0.5 to 5 wt. % of at least one ethylenically unsaturated silane bearing at least one silicon bonded hydrolysable group, preferably ɣ-methacryloxypropyl trimethoxysilane;
- (d) 0.1 to 5 wt. % of at least one ethylenically unsaturated acid, preferably a combination of acrylic acid and itaconic acid; and
- (e1) 0.5 to 8 wt. %, preferably 1 to 7 wt. % of at least one ethylenically unsaturated nitrile, preferably acrylonitrile; and
- (e2) 0.5 to 3 wt. % of at least one amide of an ethylenically unsaturated acid, preferably methacrylamide.

The skilled addressee will understand that to create effective curing between fibers it is preferable that the fibers coated with the binder is not subjected to a subsequent coating before the siloxane curing step is used.

In the context of the present invention non-wovens are defined as in ISO standard 9092 and CEN EN 29092 as a sheet of fibers, continuous filaments, or chopped yarns of any nature or origin, that have been formed into a web by any means, and bonded together by any means, with the exception of weaving or knitting. Felts obtained by wet milling are not nonwovens.

Wet-laid webs are non-wovens provided they contain a minimum of 50% of man-made fibers or other fibers of non-vegetable origin with a length to diameter ratio equal or greater than 300, or a minimum of 30% of man-made fibers with a length to diameter ratio equal or greater than 600, and a maximum apparent density of 0.40 g/cm$^3$.

Composite structures are considered to be non-wovens provided their mass is constituted of at least 50% of non-woven as per to the above definitions, or if the non-woven component plays a "prevalent role."

Non-woven textile fiber structures according to the present invention can be suitably used as base interlinings for coated sarking, roofing applications and sealing membranes. Suitable non-woven fabrics may be made from spun bond non-wovens or staple fiber webs.

Spunbonded non-wovens may be manufactured by random deposition of freshly melt-spun filaments. They consist of endless synthetic fibers made of melt-spinnable polymer materials for example polyesters in particular partially aromatic of fully aromatic polyesters. Staple fiber webs can be formed by carding, air-lay or wet-lay processes followed by web stacking by parallel-lay, cross-lay, and perpendicular-lay processes.

In both cases, the non-wovens are bonded by the binder according to the present invention to provide sufficient mechanical stability, such as good perforation strength and good tensile strength for example in processing such as bituminizing or laying. In addition, there is a need for high heat stability, and high thermo dimensional stability, for example during bituminization, or being subject to application of radiant heating. In contrast to the prior art binders, the addition of reactive thermo-set resins such as resins that emit formaldehyde upon curing are not necessary according to the present invention and are preferably avoided.

In addition to the chemical bonding, the mechanical stability can be further modified with reinforcing fibers such as glass fibers, or by composite materials, incorporated into the spunbond and staple fiber webs by knitting or stitch bond technologies, or by the use of bi-component fibers or the additional use of starches compatible with the polymer latex according to the present invention such as natural so-called native starches and modified starches, such as cationic or anionic or starch derivatives (so called chemically modified starches).

Examples of such membranes can be found in GB-A-1,517,595, EP-A-160,609, EP-A-176,847, DE-A-3,347,280, U.S. Pat. Nos. 4,472,086, 4,504,539, EP-A-0,281,643, EP 2 231 917 B1, EP-A-333,602 and EPA-A-395,548.

Another target is EIFS or ETICS systems based on woven glass fiber structures. Nevertheless, also other glass mesh systems (ETICS=External thermal insulation composite system), glass scrims, knitted scrims, glass fiber mats and glass felts max be fortified with the binder according to the present invention.

Alternatively, or additionally, the fortified fiber structure may comprise a textile fabric, typically, but not exclusively derived from glass fiber threads (yarn & roving) or filaments of any Tex range (wherein a Tex is a unit for the weight of the yarn). The glass fabric in this present description has to be understood as a glass mesh structure (woven), as a glass scrim system or as glass felt (non-woven) particularly suitable as core grids for plaster and mortar reinforcement, as screed reinforcement, support for mosaics or any for other type glass fiber reinforcement systems. Applications also include glass fiber wall papers (which may be woven and non-woven).

The common feature of these glass fabrics is the use of the binder according to the present invention, resulting in the stabilization of weave pattern, an excellent alkali resistance, ease of use by construction workers, being more resistant to mishandling, and the protection from aggressive environmental effects as well as in the fiber bonding.

The process for coating the fibers with the polymer latex can be performed to different target coat weights. The coat weight is defined as the ratio of the total weight of bone binder to the total weight of dry solid fiber, the fiber can be in an individual coated fiber or coated mesh configuration. The addressee will understand that an optimal amount is a tradeoff between mechanical properties and/or alkali resistance of the impregnated and cured fibers to the cost of the binder to achieve an effective cured textile fiber structure. The coat weight value can be above 1.0 [wt. % dry/dry], above 2.0%, above, above 3.0%, above 4.0%, above 6.0%, above 8.0%, above 10.0%, above 12.0%, above 14.0%, above 16.0%, above 17.0%, above 18.0%, above 19.0%, above 20.0%, above 21.0%, above 22.0%, above 24.0%, above 26.0%, above 28.0%, above 30.0%, above 35.0%, above 40.0%, or above 50.0% [wt. % dry/dry], or an even larger amount. The coat weight value can be below 100.0% [wt. % dry/dry], below 50.0%, below 45.0%, below 40%, below 35%, below 30.0%, below 28.0%, below 26.0%, below 24.0%, below 22.0%, below 21.0%, below 20.0%, below 19.0%, below 18.0%, below 17.0%, below 16.0%, below 14.0%, below 12.0%, below 10.0%, below 8.0%, below 6.0%, below 4.0%, below 3.0%, below 2.0%, below 1.0%, or below a lower loading. The coat weight can include all values and sub values there between.

The present invention will now be illustrated by the following examples.

EXAMPLES

Determination of Physical Parameters:

The dispersions were characterized by determination of total solids content (TSC), pH value, glass transition temperature and viscosity (Brookfield LVT).

Determination of Total Solid Contents (TSC):

The determination of total solids content is based on a gravimetric method. 1-2 g of the dispersion are weighed on an analysis balance into a tarred aluminum dish. The dish is stored for 1 hour at 120° C. in a circulating air oven until constant mass is reached. After cooling to room temperature (23° C.) the final weight is determined again. The solids content is calculated as follows:

$$TSC = \frac{m_{initial} - m_{final}}{m_{initial}} 100\%$$

$m_{initial}$ = initial weight, $m_{final}$ = weight after drying

Determination of pH Value:

The pH value is determined according to DIN ISO 976. After 2 point calibration with buffer solutions the electrode of a Schott CG 840 pH meter was immersed in the dispersion at 23° C. and the constant value on the display was recorded as pH value.

Determination of Viscosity:

The viscosities were determined at 23° C. with a Brookfield LVT viscometer. Approximately 220 ml of the liquid (freed of air bubbles) was filled into a 250 ml beaker and the spindle of the viscometer was immersed up to the mark. The viscometer is then switched on and after approximately 1 minute the value is recorded until it is constant. The viscosity range determines the choice of spindle and rotational speed and the factor for the recorded value to calculate the viscosity. The information about spindle and revolutions per minute are shown in brackets in the Table 1.

Determination of Surface Tension:

Surface tension was measured according to ISO 1409 at 23° C.

Determination of glass transition temperature:

The glass transition temperature was measured according to ISO 11357. Tmg is the midpoint temperature measured at a heating rate of 20° C./min. Due to the setup of the measurement device the starting temperature for the measurement was −78° C.

Following abbreviations are used in the examples:
AA=acrylic acid
IA=itaconic acid
MAAm=meth acrylamide
B=butadiene TSC=total solid content
Tmg=Glass transition temperature, midpoint temperature In the following all part and percentages are based on weight unless otherwise specified.

Examples 1-6

The polymer latex compositions were produced by a free radical polymerization combining an initial charge and a feed. A nitrogen-purged stainless steel pressure autoclave was charged with a seed in the initial charge together with a complexing agent (0.03 parts by weight of $Na_4EDTA$, 0.1 parts by weight of emulsifier, itaconic acid and water (about 65 parts by weight, based on 100 parts by weight of monomer including the seed latex). After heating the initial charge to the polymerization temperature the polymerization reaction was initiated by starting a feed of NaPS. 5 minutes after the NaPS feed the addition of the other monomers, chain transfer agent and emulsifier was started and fed over a period of 6 hours. Thereafter, a post activation with NaPS to reduce residual monomers was started and continued for two hours, the temperature raise in that time to 85° C., followed by a holding phase of 1 hour at 85° C. The residual monomers were removed by vacuum distillation at 60° C. The reaction mixture was cooled to room temperature; pH value was adjusted to 6.7 by using an aqueous sodium hydroxide solution, 0.5 parts by weight of a Wingstay L type antioxidant (60% dispersion in water). The total solid content was adjusted to 50% and sieved through a filter screen (90 μm). The properties of the prepared latices are summarized in Table 1.

TABLE 1

| Properties of the latex compositions | | | | | | |
|---|---|---|---|---|---|---|
| Example | 1 | 2 | 3 | 4 | 5 | 6 |
| Polymerization Temperature | 80 | 75 | 80 | 80 | 80 | 80 |
| Latex | | | | | | |
| AA | 2.5 | 2.5 | 1.5 | 1.5 | 1.5 | 1.5 |
| IA | 1 | 1 | 1 | 1 | 1 | 1 |
| ACN | 5 | 0 | 0 | 0 | 0 | 0 |
| B | 65 | 65 | 65 | 65 | 65 | 65 |
| MAAm | 1 | 1 | 1 | 1 | 1 | 1 |
| S | 21.7 | 26.7 | 27.7 | 27.2 | 26.7 | 26.2 |
| S seed | 1.3 | 1.3 | 1.3 | 1.3 | 1.3 | 1.3 |
| Memo | 2.5 | 2.5 | 2.5 | 2.0 | 1.5 | 1.0 |
| tDDM | 0.5 | 0.5 | 1.0 | 1.0 | 1.0 | 1.0 |
| Emu SAS | 0.9 | 0.9 | 0.9 | 0.9 | 0.9 | 0.9 |
| NaPS | 1.05 | 1.05 | 1.05 | 1.05 | 1.05 | 1.05 |
| Tmg DSC [° C.] | −38 | −43 | −44 | −42 | −41 | −40 |
| pH | 6.8 | 6.5 | 6.7 | 6.7 | 6.7 | 6.7 |
| Surface tension [mN/m] | 35.8 | 36.2 | 38.5 | 39.3 | 40.3 | 41.4 |
| Viscosity (spindle 2, 60 rmp) [mPas] | — | 159 | 162 | 149 | 189 | 221 |
| Blocking test | 1-2 | 1 | 1 | 2 | 2-3 | 2-3 |
| Film tackiness | 1 | 1 | 1 | 1 | 1-2 | 1-2 |

S=styrene
S seed=carboxylated styrene copolymer seed (including the weight of acrylic acid residue)
ACN=acrylonitrile
tDDM=tert dodecyl mercaptan
$Na_4EDTA$=tetra sodium salt of ethylenediaminetetraacetic acid
NaPS=sodium peroxodisulfate
Memo=ɣ-methacryloxypropyl trimethoxysilane
Emu SAS=Sodium C14-C17 secondary alkylsulfonate For comparison representing the industrial standard described in the background section a commercial XSBR latex comprising N-methylolacrylamide residues available from Synthomer Deutschland GmbH as Litex S 10946 was used in the comparative example. In the latices according to the present invention N-methylolacrylamide is substituted by ɣ-methacryloxypropyl trimethoxysilane and the glass temperature is adjusted by the monomer composition to be close to the glass temperature Litex S 10946.

TABLE 2

| Product viscosity | | |
|---|---|---|
| ISO 1652 product | TSC (%) | Viscosity (spindle 2, 60 rmp) [mPas] |
| Litex S 10946 | 50.3 | 329 |

Film Tackiness Test:

Polymer films were prepared with a film thickness of 0.7 mm by drying at a temperature of 40° C., followed by 3 minutes at 140° C. The film tackiness was evaluated from 1=non tacky to 4=very tacky/sticky.

TABLE 3

| Film tackiness | |
|---|---|
| product | tackiness |
| Litex S 10946 | 2 |

Blocking Test:

Polymer films were prepared with a film thickness of 0.5 mm by drying at a temperature of 40° C., followed by 5 minutes at 150° C. Test pieces of 2×2 cm were cut and placed in the Fixo test device of Atlas: The films were kept at 50° C. for 1 h with a load of 5 kg. After cooling to room temperature the blocking behavior was evaluated: 1=no blocking, easy to separate; 6=complete blocking, no separation possible.

TABLE 4

| Blocking resistance | |
|---|---|
| product | blocking |
| Litex S 10946 | 2 |

Testing According to DIN EN 13496 or ETAG 004—Alkaline Resistance:

The latices were used for the impregnation of glass fibers for EIFS and the residual tensile/alkaline resistance was determined. For example 1-3, a woven open mesh glass fiber structure (11 threads in warp direction and 10 threats in weft direction per 50 mm), for example 4-6, a woven open mesh glass fiber structure (13 threads in warp direction and 10 threats in weft direction per 50 mm) was used for impregnation. Test samples with 32×40 cm in size were impregnated with the latices by using a laboratory scale Foulard machine Type HVF 350 (0.8 bar, 0.5 m/minute), supplied by Mathis AG, Switzerland. The coat weight was 15-20 wt. % dry/dry of the weight of the final impregnated mesh.

The coated glass mesh was dried on a tentering frame at a temperature of 150° C. for 5 minutes, if not mentioned differently in the table.

Mechanical properties of the impregnated mesh were determined according to the DIN EN 13496 or ETAG 004. The tensile strength of the test pieces before and after chemical treatment was measured in warp and weft direction. The residual tensile strength was calculated by the ratio after and before chemical treatment in %. According to the relevant norm, the force after alkali exposure should not be below 50% of the initial as delivered state.

TABLE 5

| Residual tensile alkali resistance | | | | | |
|---|---|---|---|---|---|
| raw glass weight 128 g/m2 area coat weight [wt.-% dry/dry] ~16% | | | | | |
| Test: DIN EN 13496 | | Example 1 | Example 2 | Example 3 | Litex S 10946 |
| DIN EN 13496 | warp | 79% | 79% | 83% | 90% |
| DIN EN 13496 | weft | 92% | 86% | 86% | 91% |
| raw glass weight 133 g/m2 area coat weight [wt.-% dry/dry] ~16% | | | | | |
| Test: DIN EN 13496 | | Example 4 | Example 5 | Example 6 | Litex S 10946 |
| DIN EN 13496 | warp | 93% | 92% | 89% | 94% |
| DIN EN 13496 | weft | 83% | 87% | 83% | 96% |

As can be seen from the comparison between the inventive binder and the comparative binder, the inventive binder provides lower viscosity at the same TSC, comparable alkali resistance and can be cured to a sufficient level without emitting formaldehyde.

Although individual embodiments of the invention are described the invention covers combinations of those embodiments as well.

The invention claimed is:

1. A polymer latex obtained from an emulsion polymerization in an aqueous medium of a mixture of ethylenically unsaturated monomers comprising:

(a) 61 wt.-% to 75 wt.-% of at least one aliphatic conjugated diene, wherein the conjugated diene is selected from the group consisting of 1,3-butadiene, 2,3-dimethyl-1,3-butadiene, isoprene and combinations thereof;

(b) 10 wt.-% to 29 wt.-% of at least one vinyl aromatic compound, wherein the vinyl aromatic compound is selected from the group consisting of styrene, α-methyl styrene, p methylstyrene, t-butylstyrene, 2-vinyltoluene and combinations thereof;

(c) 0.5 to 5 wt.-% of at least one ethylenically unsaturated silane bearing at least one silicon bonded hydrolysable group;

(d) 0.1 to 8 wt.-% of at least one ethylenically unsaturated acid; and (e) up to 20 wt.-% of at least one further ethylenically unsaturated compound different from any of compounds (a) to (d), the weight percentages being based on the total amount of monomers and adding up to 100 wt.-%, and wherein the mixture of ethylenically unsaturated monomers comprises:

(e1) 0.5 to 5 wt.-% of at least one amide of an ethylenically unsaturated acid, wherein the emulsion polymerization is carried out using a seed latex.

2. The polymer latex of claim 1, wherein the mixture of ethylenically unsaturated monomers comprises:

(a) 61 wt.-% to 70 wt.-% of at least one aliphatic conjugated diene, wherein the conjugated diene is selected from the group consisting of 1,3-butadiene, 2,3-dimethyl-1,3-butadiene, isoprene and combinations thereof;

(b) 15 wt.-% to 29 wt.-% of at least one vinyl aromatic compound, wherein the vinyl aromatic compound is selected from the group consisting of styrene, a-methyl styrene, p methylstyrene, t-butylstyrene, 2-vinyltoluene and combinations thereof;

(c) 0.5 to 5 wt.-% of at least one ethylenically unsaturated silane bearing at least one silicon bonded hydrolysable group;

(d) 0.1 to 7 wt.-% of at least one ethylenically unsaturated acid; and (e) up to 20 wt.-% of at least one further ethylenically unsaturated compound different from any of compounds (a) to (d), the weight percentages being based on the total amount of monomers and adding up to 100 wt.-%, and wherein the mixture of ethylenically unsaturated monomers comprises:

(e1) 0.5 to 5 wt.-% of at least one amide of an ethylenically unsaturated acid.

3. The polymer latex of claim 1, wherein (c) the ethylenically unsaturated silane bearing at least one silicon bonded hydrolysable group is selected from ɣ-methacryloxypropyl trimethoxysilane, ɣ-methacryloxypropyl triethoxysilane, ɣ-methacryloxypropyl methyldimethoxysilane, ɣ-methacryloxypropyl dimethylmethoxysilane, 3-(N-allylamino) propyl trimethoxysilane, allyltrimethoxysilane, allyltriethoxysilane, allylmethyldimethoxysilane, vinyltrimethoxysilane, vinyltriethoxysilane, vinylmethyldimethoxysilane and combinations thereof; and/or (d) the ethylenically unsaturated acid is selected from at least one of (meth)acrylic acid, itaconic acid, maleic acid, fumaric acid, crotonic acid, vinyl acetic acid, vinyl lactic acid, vinyl sulfonic acid, styrene sulfonic acid, acrylamidomethyl propane sulfonic acid and combinations thereof; and/or (e) the ethylenically unsaturated monomer different from the monomers a) to d) is selected from at least one of alkyl esters or hydroxy alkyl esters of (meth) acrylic acid, unsaturated nitriles, vinyl esters of carboxylic acids, amides of ethylenically unsaturated acids, vinyl compounds containing sulphonate, sulphonic acid and/or amide groups.

4. The polymer latex of claim 1, wherein the mixture of ethylenically unsaturated monomers further comprises:

(e2) 0 to 10 wt.-% of at least one ethylenically unsaturated nitrile.

5. The polymer latex of claim 4, wherein (a) the aliphatic conjugated diene is butadiene;

(b) the aromatic vinyl compound is styrene;

(c) the ethylenically unsaturated silane bearing at least one silicon bonded hydrolysable group is selected from ɣ-methacryloxypropyl and trimethoxysilane;

(d) the ethylenically unsaturated acid is selected from acrylic acid, itaconic acid or a combination thereof;

(e2) the ethylenically unsaturated nitrile is acrylonitrile; and (e1) the amide of an ethylenically unsaturated acid is (meth)acrylamide.

6. A binder comprising a polymer latex of claim 1.

7. The binder of claim 6, wherein the binder is free of formaldehyde emitting components, and/or wherein the polymer latex is the sole binder.

8. The binder of claim 6, wherein the binder has a surface tension of 20 to 52 mN/m measured according to ISO 1409 at 23° C.

9. A fiber structure fortified by a binder according to claim 6.

10. The fiber structure of claim 9, comprising man-made fibers selected from non-woven structures and woven structures, a textile fiber structure or a fiber structure is selected from paper and card board.

11. The fiber structure of claim 10, wherein the man-made fibers are selected from organic polymer fibers, carbon fibers and glass fibers, wherein the organic polymer fibers are selected from fibers comprising polyester, polyetherester, polyurethane, polybutylene terephthalate, hydroxyl functionalized polyolefins such as (meth)acrylic acid-g-propylene, polyvinyl alcohol or it's acetals or ketals, nylon 6, nylon 66, polyethylene, polypropylene, polyarylene sulphide, polyether ether ketone, poly acrylonitrile, or artificial polyisoprene, and acrylic fibers, modacrylic fibers, aramid or kevlar fibers, nomex fibers, spandex fibers, chemically modified polycarbonate fibers, chemically treated vinylidine fibers, chemically treated PVDC or PVC fibers, or combinations thereof, or wherein the carbon fibers are selected from fibers comprising graphitic carbon, activated fibrous carbon, glassy carbon, graphite-epoxy blends, fullerne type carbon, or combinations of the fibers.

12. The fiber structure of claim 10, wherein the fiber is a glass fiber and the textile structure is a woven structure.

13. An exterior insulation finishing system comprising the fiber structure of claim 9, where the fiber structure is a glass fiber.

14. A method of fortifying a fiber structure comprising adding to the fiber structure a binder comprising the polymer latex of claim 1.

15. The polymer latex of claim 1, wherein the polymer latex does not contain any formaldehyde.

* * * * *